(12) United States Patent
Kaindl et al.

(10) Patent No.: US 7,779,942 B2
(45) Date of Patent: Aug. 24, 2010

(54) MOTOR VEHICLE

(75) Inventors: Markus Kaindl, Rohrbach (DE); Georg Goetz, Steinkirchen (DE); Juergen Gebert, Moosburg (DE); Florian Oesterreicher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 340 days.

(21) Appl. No.: 11/859,233

(22) Filed: Sep. 21, 2007

(65) Prior Publication Data

US 2008/0073132 A1   Mar. 27, 2008

(30) Foreign Application Priority Data

Sep. 22, 2006   (DE) ................. 10 2006 044 814

(51) Int. Cl.
*B60L 11/00* (2006.01)

(52) U.S. Cl. ............. 180/65.1; 180/65.285; 180/65.31; 180/65.21; 318/139

(58) Field of Classification Search .............. 180/65.21, 180/65.265, 65.275, 65.285, 65.29; 318/139
See application file for complete search history.

(56) References Cited

U.S. PATENT DOCUMENTS

| | | | | |
|---|---|---|---|---|
| 5,915,488 A * | 6/1999 | Fliege | ................. | 180/65.22 |
| 5,965,991 A * | 10/1999 | Koike et al. | ................. | 318/139 |
| 6,819,066 B2 | 11/2004 | Ishikawa et al. | | |
| 7,064,513 B2 * | 6/2006 | Fenley | ................. | 318/700 |
| 7,088,595 B2 * | 8/2006 | Nino | ................. | 363/17 |
| 7,102,903 B2 * | 9/2006 | Nakamura et al. | ................. | 363/98 |
| 2005/0249989 A1 * | 11/2005 | Pearson | ................. | 429/13 |
| 2009/0058326 A1 * | 3/2009 | Oyobe et al. | ................. | 318/53 |

FOREIGN PATENT DOCUMENTS

| | | |
|---|---|---|
| DE | 195 02 501 A1 | 8/1996 |
| DE | 102 58 211 A1 | 1/2004 |
| DE | 102 52 507 A1 | 5/2004 |

OTHER PUBLICATIONS

German Search Report dated Jul. 5, 2007 with English Translation of relevant portion (Nine (9) pages).

* cited by examiner

*Primary Examiner*—Lesley Morris
*Assistant Examiner*—Erez Gurari
(74) *Attorney, Agent, or Firm*—Crowell & Moring LLP

(57) ABSTRACT

A motor vehicle (KFZ) including an electric power source (EQ) for providing DC current, a converter (U) for converting the DC current into three-phase AC current of identical phase angle or polyphase current as a function of the vehicle operating state, and an electric machine (EM), to which the current provided by the converter is fed, is provided.

20 Claims, 1 Drawing Sheet

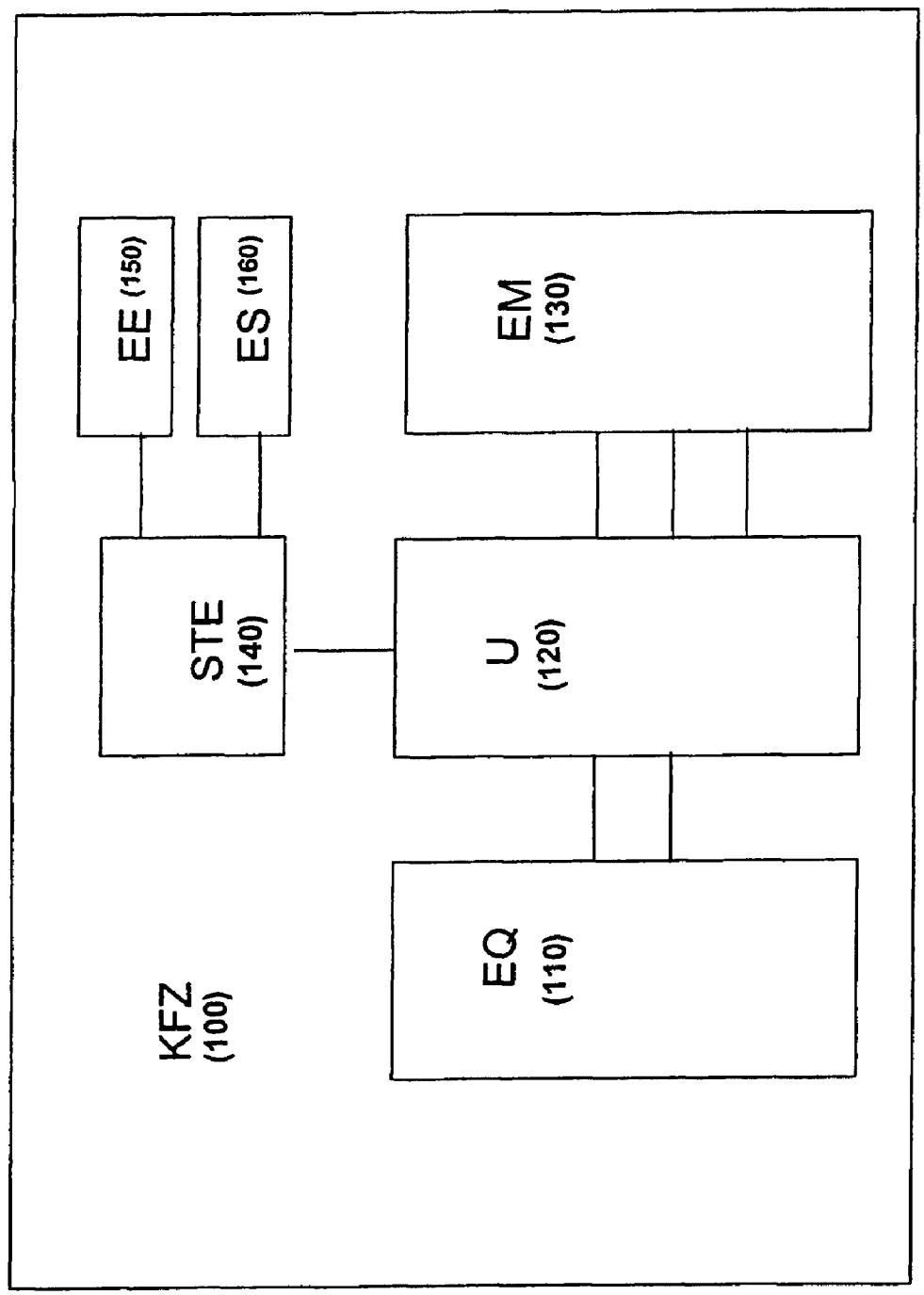

MOTOR VEHICLE

CROSS REFERENCE TO RELATED APPLICATIONS

This application claims priority under 35 U.S.C. §119 to German Patent Application No. 10 2006 0044 814.6 filed Sep. 22, 2006, the entire disclosure of which is herein expressly incorporated by reference.

BACKGROUND AND SUMMARY OF THE INVENTION

The present invention relates to a motor vehicle having an electric machine.

An electric power supply of a motor vehicle having hybrid drive is known from DE 10252507 A1, for example. Inter alia, super capacitors (so-called "super caps") are disclosed in this case as the electrical power accumulators. The use of such super capacitors has the advantage that stored electrical power is transferable in a large amount in a short time from the power accumulators to an electric machine to accelerate the motor vehicle, for example.

However, precisely this advantage is a disadvantage in specific vehicle operating states, for example, in an accident situation or a repair situation. This is because in the cited situations, the rapid availability of high power represents a danger to the humans, for example, to rescue personnel or motor vehicle mechanics.

The present invention is therefore based on the object of specifying a motor vehicle having electric machine and electrical power source, whose handling is possible safely in many vehicle operating states.

This and other objects and advantages are achieved by exemplary embodiments of the present invention, in which a motor vehicle having an electrical power source, in particular a power accumulator, for providing DC current, is equipped with a converter (power converter, power inverter) for converting the DC current into three-phase AC current of identical phase angle or polyphase current as a function of the vehicle operating state, and with an electric machine, such as a polyphase machine, which is fed the current provided by the converter.

The present invention is based on the idea of discharging the power source in a controlled way in specific vehicle operating states, for example, in a vehicle operating state "accident" (accident vehicle operating state) or in a vehicle operating state "repair" (repair vehicle operating state). After the discharge of the power source, it is possible to handle the motor vehicle safely even in the cited vehicle operating states.

For the controlled discharge (safety discharge) the converter may be set up automatically in such a way in critical vehicle operating states that it outputs—not polyphase current as in normal vehicle operating states, but rather—three-phase AC current of identical phase angle to the electric machine. Components of the electric machine are thus used in the cited vehicle operating states to "dispose of" the power provided by the power source, for example. Separate discharge resistors or discharge circuits provided for this purpose, as are required in guidelines of electrical engineering, for example, may thus be dispensed with. Weight and installation space may thus be saved.

The motor vehicle advantageously includes a control unit, which is set up to control the converter in such a way that the converter automatically provides three-phase AC current of identical phase angle or polyphase current as a function of a current vehicle operating state. In particular, the control unit may be set up in such a way that the converter automatically provides three-phase AC current of identical phase angle and/or feeds the electric machine upon the presence of a critical vehicle operating state and automatically provides polyphase current in other or normal vehicle operating states.

To efficiently "dispose of" the DC current power provided by the power source in the electric machine or convert it into heat, a converter is provided that is set up in such a way in specific vehicle operating states that instead of polyphase current (three-phase AC current of differing phase angle), three-phase AC current of identical phase angle is output by the converter in these vehicle operating states. Therefore, essentially no rotating field is generated in the electric machine. Instead, an alternating field is applied to the windings of the electric machine, and the power provided is thus degraded by unfavorable operation of the electric machine, essentially without generating a torque. The electric machine is thus intentionally not driven in the cited, particularly critical vehicle operating states, but rather is only used for "power disposal."

In an exemplary embodiment of the present invention, the control unit is set up in such a way that the converter automatically provides three-phase AC current of identical phase angle or feeds the electric machine upon the existence of a critical vehicle operating state and upon detecting a current vehicle velocity which falls below a predefined limit velocity, in particular upon detecting a current vehicle velocity of 0 km/h. A safety discharge of the power source as described above may thus reliably be prevented from occurring during normal travel, which could result in damage to the engine and/or the transmission.

The electric power source is, for example, a super capacitor, a motor vehicle battery, or a fuel cell, which may cause the propulsion of the vehicle.

A detection unit, which feeds the detected current vehicle operating state to the control unit, may be provided for detecting the current vehicle operating state.

In an exemplary embodiment of the present invention, the detection unit includes an acceleration sensor, the detection unit being set up in such a way that it may detect an accident vehicle operating state, in particular if the detected acceleration exceeds a predefined threshold value. A safety discharge via the electric machine as explained above may thus be triggered.

An input interface, which feeds the input current vehicle operating state to the control unit, may be provided for inputting the current vehicle operating state.

In an exemplary embodiment of the present invention, the input interface is set up in such a way that a repair vehicle operating state may be input via the input interface, so that a safety discharge via the electric machine as explained above may thus also be triggered.

The motor vehicle, in particular as a hybrid vehicle, is advantageously drivable by the electric machine and/or the power source is chargeable by the power of the motor vehicle and/or based on an internal combustion engine of the motor vehicle.

The present invention has been shown to be especially advantageous if the power source has one, multiple, or all of the following three properties:

discharge time of the power source is less than 20 seconds;
power content of the power source is greater than 100 watt-hours;
the rated voltage of the power source is greater than 60 volts.

This is because the handling of a motor vehicle in the cited critical vehicle operating states is especially hazardous when power sources of this type are used and/or rapid and reliable discharge of the power source in the cited critical vehicle operating states without knowledge of the present invention is especially complex.

In an exemplary embodiment of the present invention, the power source includes a fuel cell fed from a hydrogen tank, the control unit for controlling the converter being set up in such a way that the converter automatically provides three-phase AC current of identical phase angle or polyphase current as a function of the state of the hydrogen tank, in particular the pressure conditions in the tank. In particular, three-phase AC current of identical phase angle is automatically provided or fed to the electric machine if the pressure in the hydrogen tank exceeds a predefined limiting pressure, or if the so-called boil-off state, in which hydrogen must be bled in a controlled way from the tank for safety reasons, is detected or imminent.

Instead of bleeding hydrogen from the hydrogen tank, in this embodiment, power is disposed of in a controlled way, which is fed for this purpose to the electric machine as three-phase AC current of identical phase angle via the converter. The converter is powered with electrical power, in particular DC current, by the fuel cell. The fuel cell consumes hydrogen from the hydrogen tank for this purpose, so that the cited limiting pressure is not exceeded, and/or the boil-off state does not occur or is delayed. The boil-off state of the hydrogen tank may also be considered a critical vehicle operating state. In normal vehicle operating states, in contrast, polyphase current is provided by the converter.

In the following, the present invention is explained in greater detail on the basis of examples with reference to the following FIGURE.

Other objects, advantages and novel features of the present invention will become apparent from the following detailed description of the invention when considered in conjunction with the accompanying drawings.

BRIEF DESCRIPTION OF THE DRAWING

The FIGURE shows a simplified schematic circuit diagram of a motor vehicle.

DETAILED DESCRIPTION OF THE DRAWING

The FIGURE is restricted to the components necessary for understanding the present invention. Of course, the motor vehicle KFZ 100 may have all further components typical for a motor vehicle, in particular having electric drive or hybrid drive.

The FIGURE shows a power source EQ 110, which supplies a converter U 120 with DC current via two connection lines. In the normal vehicle operating states, in particular in normal electric-motor travel, the DC current is converted by the converter U 120 into a polyphase current, which is in turn fed to an electric machine EM 130 via three connection lines to drive it.

The converter U 120 is activated by a control unit STE 140, such as a program-controlled processor unit or an application-specific circuit.

If a critical vehicle operating state, such as an accident, is detected by a detection unit EE 150, such as a crash sensor, and signaled to the control unit, or a critical vehicle operating state, such as a vehicle repair, is input via an input interface ES 160, such as a key or a testing device, and signaled to the control unit, the converter U 120 is automatically activated in such a way that the DC current of the power source EQ 110 is converted into three-phase AC current of identical phase and fed via the three connection lines to the electric machine EM 130. The power source EQ 110 may thus be discharged in a controlled way.

After a discharge of the power source EQ 110 detected by a measuring device, for example, it may be displayed by the output of an optical or acoustic signal that the power source EQ 110 has been discharged, and that rescue personnel or mechanics are no longer subject to danger from the power source EQ 110.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
   an electric power source for providing DC current;
   a converter for converting the DC current into three-phase AC current of identical phase angle when the motor vehicle is in either one of an accident vehicle operating state and a repair vehicle operating state, and converting the DC current into polyphase current when the motor vehicle is in a vehicle operating state other than the accident vehicle operating state and the repair vehicle operating state;
   an electric machine, to which the current provided by the converter is fed; and
   a control unit, which is set up to control the converter in such a way that the converter automatically provides three-phase AC current of identical phase angle when the motor vehicle is in either one of the accident vehicle operating state and the repair vehicle operating state and polyphase current when the motor vehicle is in a vehicle operating state other than the accident vehicle operating state and the repair vehicle operating state.

2. The motor vehicle according to claim 1, further comprising a detection unit for detecting the vehicle operating state, which is signaled to the control unit.

3. The motor vehicle according to claim 1, further comprising an input interface for inputting the vehicle operating state, which is signaled to the control unit.

4. The motor vehicle according to claim 1, wherein the power source comprises a super capacitor.

5. The motor vehicle according to claim 1, further comprising a detection unit for detecting the current vehicle operating state, which is signaled to the control unit, wherein the detection unit comprises an acceleration sensor, and
   the detection unit is set up in such way that it may detect the accident vehicle operating state.

6. The motor vehicle according to claim 3, wherein the input interface is set up in such way that the repair vehicle operating state may be input via the input interface.

7. The motor vehicle according to claim 1, wherein the motor vehicle is drivable by the electric machine or the power source is chargeable by the power of the motor vehicle or the power provided by an internal combustion engine of the motor vehicle.

8. The motor vehicle according to claim 1, wherein the power source has at least one of the following properties:
   discharge time of the power source is less than 20 seconds;
   power content of the power source is greater than 100 watt-hours; and
   the rated voltage of the power source is greater than 60 volts.

9. A motor vehicle comprising:
an electric power source for providing DC current;
a converter for converting the DC current into three-phase AC current of identical phase angle or polyphase current as a function of vehicle operating state;
an electric machine, to which the current provided by the converter is fed; and
a control unit, which is set up to control the converter in such a way that the converter automatically provides three-phase AC current of identical phase angle or polyphase current as a function of a current vehicle operating state,
wherein the control unit controls the converter in such a way that the converter automatically provides three-phase AC current of identical phase angle or polyphase current as a function of the state of a hydrogen tank,
wherein the power source comprises a fuel cell fed from the hydrogen tank.

10. The motor vehicle according to claim 2, further comprising an input interface for inputting the current vehicle operating state, which is signaled to the control unit.

11. The motor vehicle according to claim 2, wherein the power source comprises a super capacitor.

12. The motor vehicle according to claim 3, wherein the power source comprises a super capacitor.

13. The motor vehicle according to claim 2, wherein the detection unit comprises an acceleration sensor, and
the detection unit is set up in such way that it may detect an accident vehicle operating state.

14. The motor vehicle according to claim 3, wherein the detection unit comprises an acceleration sensor, and
the detection unit is set up in such way that it may detect an accident vehicle operating state.

15. The motor vehicle according to claim 2, wherein the motor vehicle is drivable by the electric machine or the power source is chargeable by the power of the motor vehicle or the power provided by an internal combustion engine of the motor vehicle.

16. The motor vehicle according to claim 3, wherein the motor vehicle is drivable by the electric machine or the power source is chargeable by the power of the motor vehicle or the power provided by an internal combustion engine of the motor vehicle.

17. The motor vehicle according to claim 2, wherein the power source has at least one of the following properties:
discharge time of the power source is less than 20 seconds;
power content of the power source is greater than 100 watt-hours; and
the rated voltage of the power source is greater than 60 volts.

18. The motor vehicle according to claim 3, wherein the power source has at least one of the following properties:
discharge time of the power source is less than 20 seconds;
power content of the power source is greater than 100 watt-hours; and
the rated voltage of the power source is greater than 60 volts.

19. The motor vehicle according to claim 2, wherein the control unit controls the converter in such a way that the converter automatically provides three-phase AC current of identical phase angle or polyphase current as a function of the state of a hydrogen tank,
wherein the power source comprises a fuel cell fed from the hydrogen tank.

20. A method for controlling a converter of a motor vehicle, comprising the acts of:
providing DC current to the converter;
automatically converting the DC current into three-phase AC current of identical phase angle when the motor vehicle is in either one of an accident vehicle operating state and a repair vehicle operating state, and automatically converting the DC current into polyphase current when the motor vehicle is in a vehicle operating state other than the accident vehicle operating state and the repair vehicle operating state; and
outputting the three-phase AC current of identical phase angle when the motor vehicle is in either one of the accident vehicle operating state and the repair vehicle operating state and the polyphase current when the motor vehicle is in a vehicle operating state other than the accident vehicle operating state and the repair vehicle operating state from the converter to an electric machine.

* * * * *